United States Patent
Kadetotad et al.

(10) Patent No.: US 11,220,259 B2
(45) Date of Patent: Jan. 11, 2022

(54) MULTI-SENSOR PROBABILISTIC OBJECT DETECTION AND AUTOMATED BRAKING

(71) Applicant: Ford Global Technologies, LLC., Dearborn, MI (US)

(72) Inventors: Sneha Kadetotad, Cupertino, CA (US); Jinesh J Jain, Palo Alto, CA (US); Vidya Nariyambut Murali, Sunnyvale, CA (US); Dongran Liu, San Jose, CA (US); Marcos Paul Gerardo Castro, Mountain View, CA (US); Adil Nizam Siddiqui, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 16/400,763

(22) Filed: May 1, 2019

(65) Prior Publication Data

US 2019/0256089 A1 Aug. 22, 2019

Related U.S. Application Data

(63) Continuation of application No. 15/363,763, filed on Nov. 29, 2016, now Pat. No. 10,315,649.

(51) Int. Cl.
*B60W 30/09* (2012.01)
*B60W 30/08* (2012.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
CPC ...... B60W 30/09; B60W 30/08; B60W 10/04; B60W 10/18; B60W 10/20;
(Continued)

(56) References Cited

U.S. PATENT DOCUMENTS

| 5,594,414 A * | 1/1997 | Namngani | G01P 15/00 340/436 |
| 5,710,565 A * | 1/1998 | Shirai | B62D 1/28 342/70 |

(Continued)

*Primary Examiner* — Jason Holloway
(74) *Attorney, Agent, or Firm* — David R. Stevens; Stevens Law Group

(57) ABSTRACT

A controller receives outputs from a plurality of sensors such as a camera, LIDAR sensor, RADAR sensor, and ultrasound sensor, which may be rearward facing. A probability is updated each time a feature in a sensor output indicates presence of an object. The probability may be updated as a function of a variance of the sensor providing the output and a distance to the feature. Where the variance of a sensor is directional, directional probabilities may be updated according to these variances and the distance to the feature. If the probability meets a threshold condition, actions may be taken such as a perceptible alert or automatic braking. The probability may be decayed in the absence of detection of objects. Increasing or decreasing trends in the probability may be amplified by further increasing or decreasing the probability.

17 Claims, 4 Drawing Sheets

(51) Int. Cl.
   *B60W 10/04*   (2006.01)
   *B60W 10/18*   (2012.01)
   *B60W 10/20*   (2006.01)
   *B60W 30/095*  (2012.01)
   *B60W 40/04*   (2006.01)

(52) U.S. Cl.
   CPC ........ *B60W 30/08* (2013.01); *B60W 30/0956* (2013.01); *B60W 40/04* (2013.01); *B60W 2420/42* (2013.01); *B60W 2420/52* (2013.01); *B60W 2420/54* (2013.01); *B60W 2554/00* (2020.02)

(58) Field of Classification Search
   CPC ............ B60W 30/0956; B60W 40/04; B60W 2554/00; B60W 2420/42; B60W 2420/54; B60W 2420/52; B60W 2710/18; B60W 2710/20; G01S 13/931; G01S 15/931; G01S 17/931
   See application file for complete search history.

(56) References Cited

U.S. PATENT DOCUMENTS

| | | | |
|---|---|---|---|
| 7,266,477 | B2 | 9/2007 | Foessel |
| 7,542,825 | B2 | 6/2009 | Kawasaki |
| 9,129,211 | B2 | 9/2015 | Zeng |
| 9,139,204 | B1 | 9/2015 | Zhao |
| 9,255,988 | B2 | 2/2016 | Zeng |
| 2005/0125154 | A1* | 6/2005 | Kawasaki ................ G01D 1/16 701/301 |
| 2007/0009137 | A1* | 1/2007 | Miyoshi .................... B60R 1/00 382/104 |
| 2014/0203925 | A1* | 7/2014 | Augst .................... B60Q 9/007 340/435 |
| 2015/0210280 | A1* | 7/2015 | Agnew ............... B60W 30/095 701/48 |

\* cited by examiner

MULTI-SENSOR PROBABILISTIC OBJECT DETECTION AND AUTOMATED BRAKING

CROSS REFERENCE TO RELATED PATENT APPLICATION

The present application is a continuation of U.S. patent application Ser. No. 15/363,763, filed on Nov. 29, 2016, which is incorporated by reference in its entirety.

BACKGROUND

Field of the Invention

This invention relates to performing obstacle detection, such as for use in autonomous vehicles.

Background of the Invention

Drivers of vehicles are expected to pay attention to their surroundings at all times. But many times, especially during reversing, drivers can lose attention or miss objects in a scene simply due to the physics of the situation. This is further accentuated in situations where a dynamic object (person, cyclist, car, etc.) comes into the path of a reversing vehicle. Many vehicles have passive systems including sensors such as cameras, ultrasonic sensors, RADAR, etc., for identifying the vehicle's surroundings but these passive systems rely on the driver to be aware at all times and fast enough to react to emergencies in time. Additionally, each sensor has its own limitations such as field of view, range, etc.

The systems and methods disclosed herein provide an improved approach for obstacle detection using sensor data, particularly while reversing.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
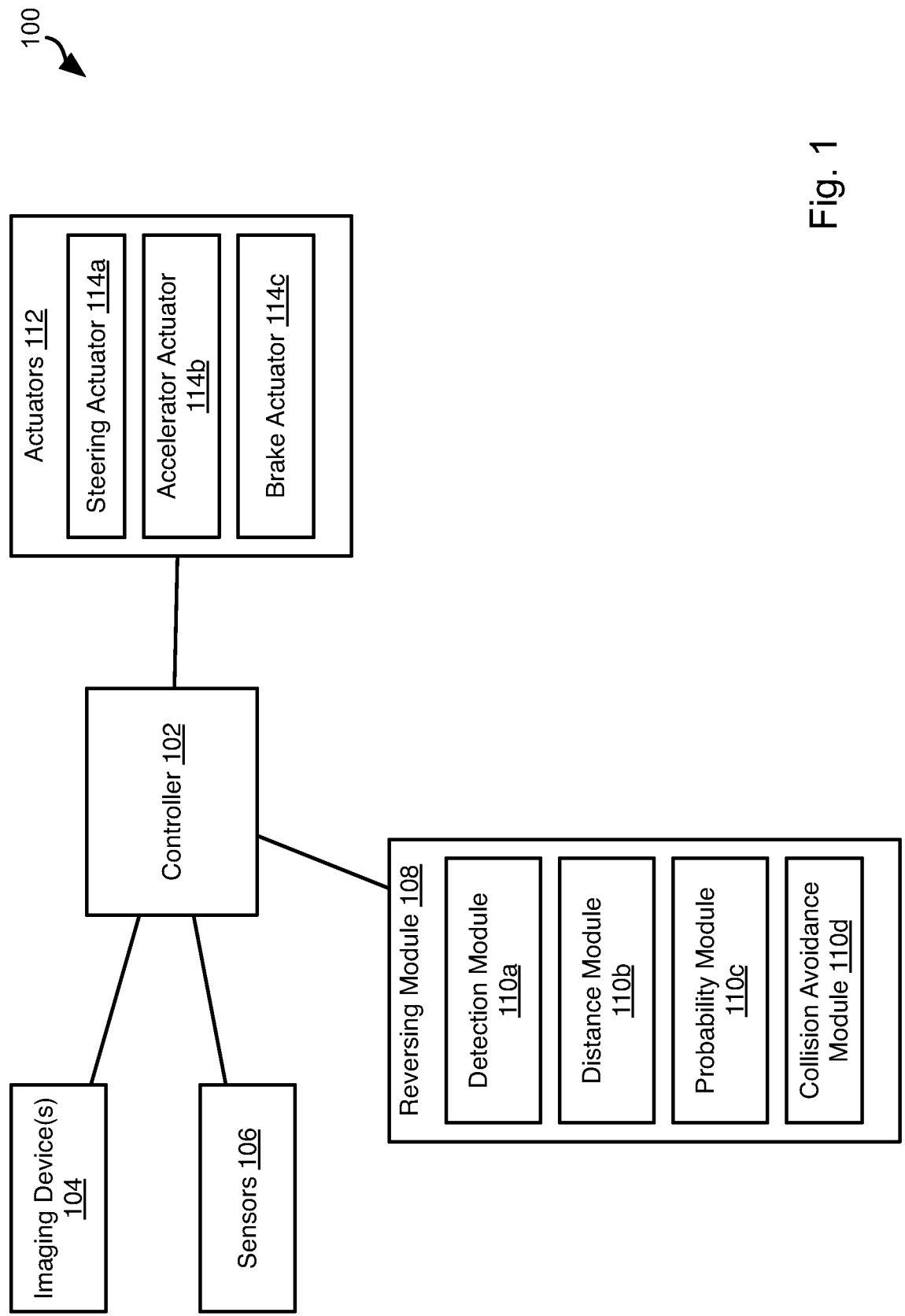
FIG. 1 is a schematic block diagram of a system for implementing embodiments of the invention.

Referring to FIG. 1, a system 100 may include a controller 102 housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform collision detection. The controller 102 may generate alerts in response to detecting a potential collision and/or may perform autonomous collision avoidance. The controller 102 may receive one or more image streams from one or more imaging devices 104. For example, one or more cameras may be mounted to the vehicle and output image streams received by the controller 102. The controller 102 may receive one or more data streams from one or more sensors 106. For example, the controller 102 may be coupled to one or more other sensors 106 that are mounted to the vehicle. The sensors may include RADAR (radio distancing and ranging) sensors, LIDAR (light distancing and ranging) sensors, SONAR (sound navigation and ranging) sensors, ultrasonic sensors, and the like.

The imaging devices 104 and other sensors 106 detect the environment by a plurality of different modalities and provide many ways to detect the same object. The systems and methods disclosed herein provide a way in which the outputs of the imaging devices 104 and other sensors 106 may all be used to detect potential obstacles with greater certainty while reducing false positives due to sensor noise.

The systems and methods disclosed herein are particularly useful for avoiding collisions while reversing. Accordingly, the fields of view of at least some of the imaging devices 104 and sensors 106 may be rearward facing.

A reversing module 108 may include a detection module 110*a* that is programmed to detect features in outputs of the imaging devices 104 and other sensors 106 that correspond to objects in a vehicle's path while reversing. In particular, the detection module 110*a* may detect objects within a zone of interest behind the vehicle as discussed below with respect to FIG. 3.

The reversing module 108 may further include a distance module 110*b* that estimates a distance to features detected in the outputs of the imaging devices 104 and sensors 106. For example, for imaging devices, binocular vision may be used to provide three-dimensional data from two images. Distance estimates to objects in the three-dimensional data may then be made based on the locations indicated by this data. Likewise, RADAR and ultrasound sensors 106 may provide information on the distance and velocity of objects. LIDAR provides a three-dimensional point cloud from which the location of objects may be determined. For all sensor outputs, the distances determined may be transformed to a common coordinate system in order to provide consistency. For example, some systems may provide a "time to impact" estimate, which may be transformed into an approximate distance by the distance module 110*b*.

The reversing module 108 may further include a probability module 110*c*. Each time an object is sensed in the output of any of the imaging devices 104 or sensors 106, the probability that an object is present behind a vehicle is updated. In some embodiments a probability may also be updated by the probability module 110*c* such that each time the object is sensed, the probability is increased. The probability indicates a likelihood that an object is in fact present in a zone of interest behind the vehicle. The probability may be computed according to a Bayesian statistical model and updated with each sensing of the object according to a Bayesian probability update technique. The updating of the probability may be performed according to the approach described below with respect to FIG. 4. As described in greater detail below, the probability may be updated such that the smaller the distance for a feature, the greater the increase in the probability will be.

The reversing module 108 may include a collision avoidance module 110d. Upon detecting a probability of an object located in the zone of interest that meets a threshold condition, the collision avoidance module 110d may take action to avoid impact with the object. This may include automatically stopping the vehicle by applying the brake and removing an accelerator input. This may be the case where the vehicle is non-autonomous and the reversing module 108 is present as an aid to a human driver.

In embodiments where the vehicle is autonomous, the collision avoidance module 110d may take other actions to avoid collision with an obstacle detected according to the modules 110a-110c. For example, the collision avoidance module 110d may control the trajectory of the vehicle by actuating one or more actuators 112 controlling the direction and speed of the vehicle. For example, the actuators 112 may include a steering actuator 114a, an accelerator actuator 114b, and a brake actuator 114c. The configuration of the actuators 114a-114c may be according to any implementation of such actuators known in the art of autonomous vehicles.

Figure 2:
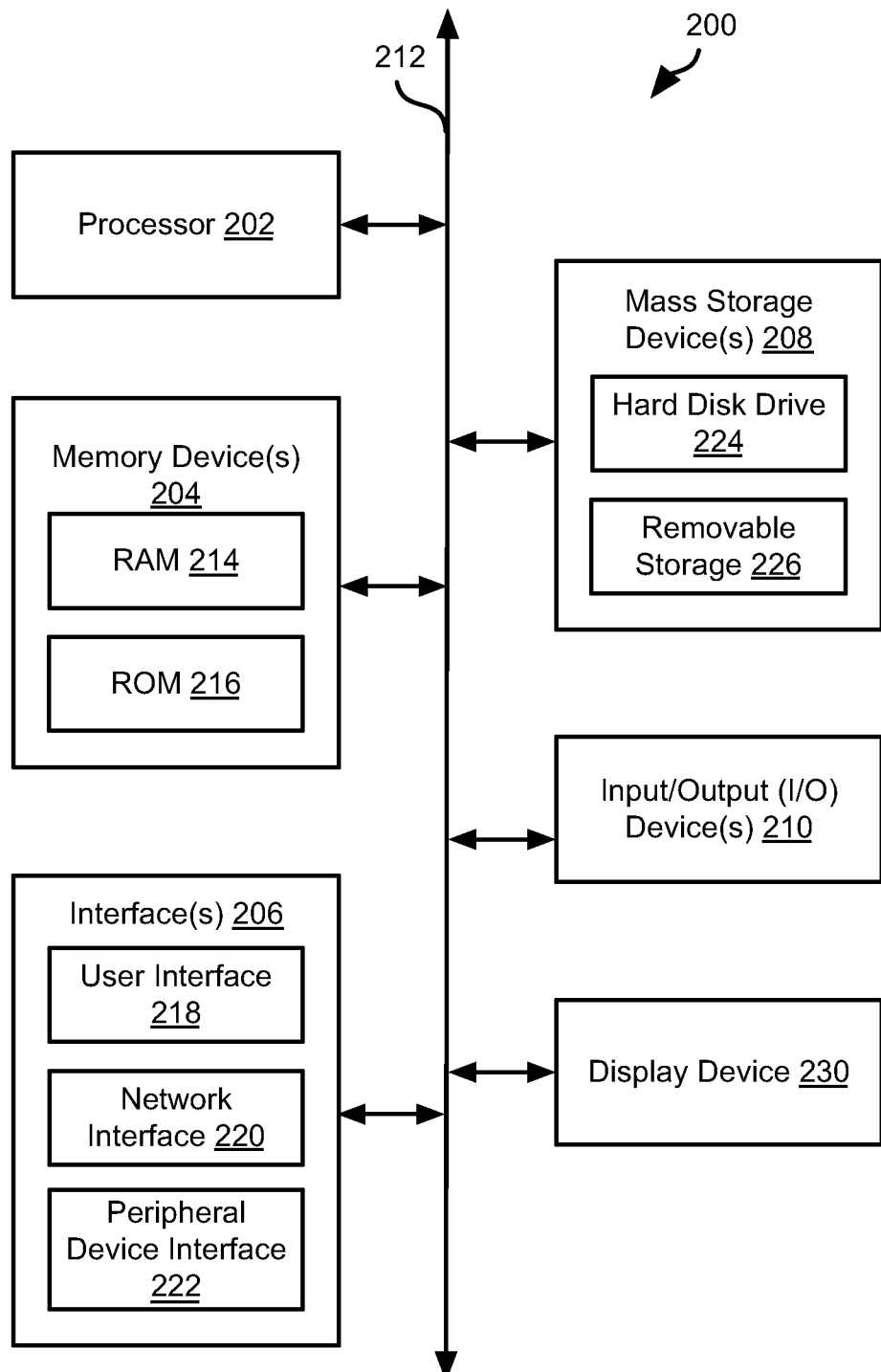
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
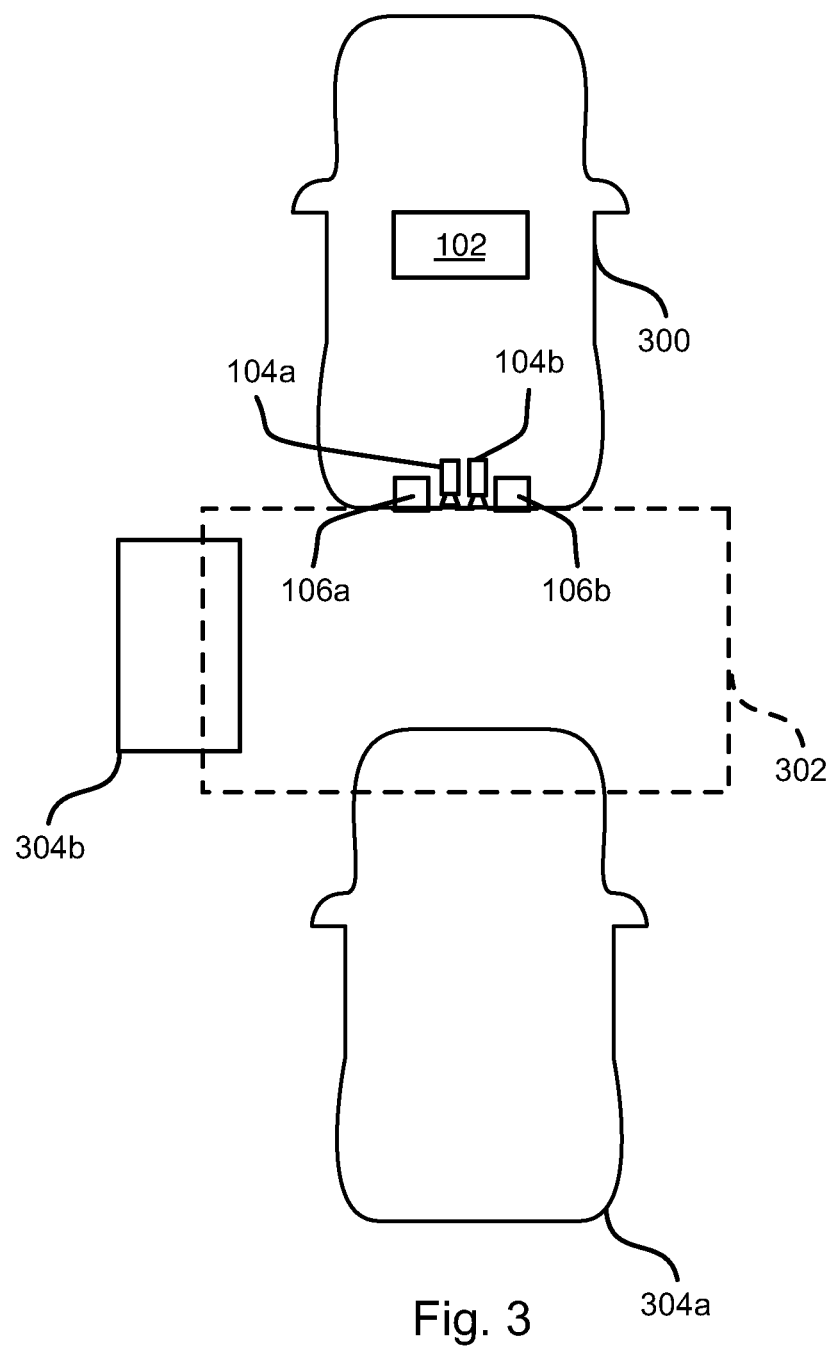
FIG. 3 is a schematic diagram illustrating a scenario including a reversing vehicle incorporating sensors.

Turning now to FIG. 3, a vehicle 300 housing the controller 102 may have rearward facing sensors 106a, 106b, such as a LIDAR, RADAR, ultrasonic, or other sensors. The vehicle 300 may further include rearward facing cameras 104a, 104b. The rearward facing cameras 104a, 104b may implement binocular vision such that the three-dimensional location of objects may be determined from the outputs of the cameras 104a, 104b. The outputs of the sensors 106a, 106b may also be in the form of three-dimensional data, such as in the form of a point cloud wherein each point indicating a location at which material was detected. Other sensors may detect objects in lateral or forward regions of the vehicle 300. Although the systems and methods disclosed herein are particularly useful for improving safety while reversing, they may also be applied to forward movement with forward facing cameras and other sensors.

The methods disclosed herein are particularly concerned with a zone of interest 302 behind the vehicle 300. As is apparent, the zone of interest 302 extends longitudinally rearwardly of the vehicle 300 and may also extend laterally on either side of the vehicle 300. The imaging devices 104a, 104b and other sensors 106a, 106b have this zone of interest in their field of view. In some embodiments, the fields of view of the imaging devices 104a, 104b and other sensors 106a, 106b may extend further than this zone of interest 302. In such embodiments, features in sensor outputs indicating a location outside of the zone of interest 302 may be ignored or have a reduced impact on the probability that an object is located in the zone of interest 302 as compared to features located in the zone of interest 302.

Objects 304a, 304b located within the zone of interest 302 are detected by the imaging devices 104a, 104b and other sensors 106a, 106b and braking of the vehicle 300 may be invoked. The method by which objects 304a, 304b are detected is described below with respect to FIG. 4.

Figure 4:
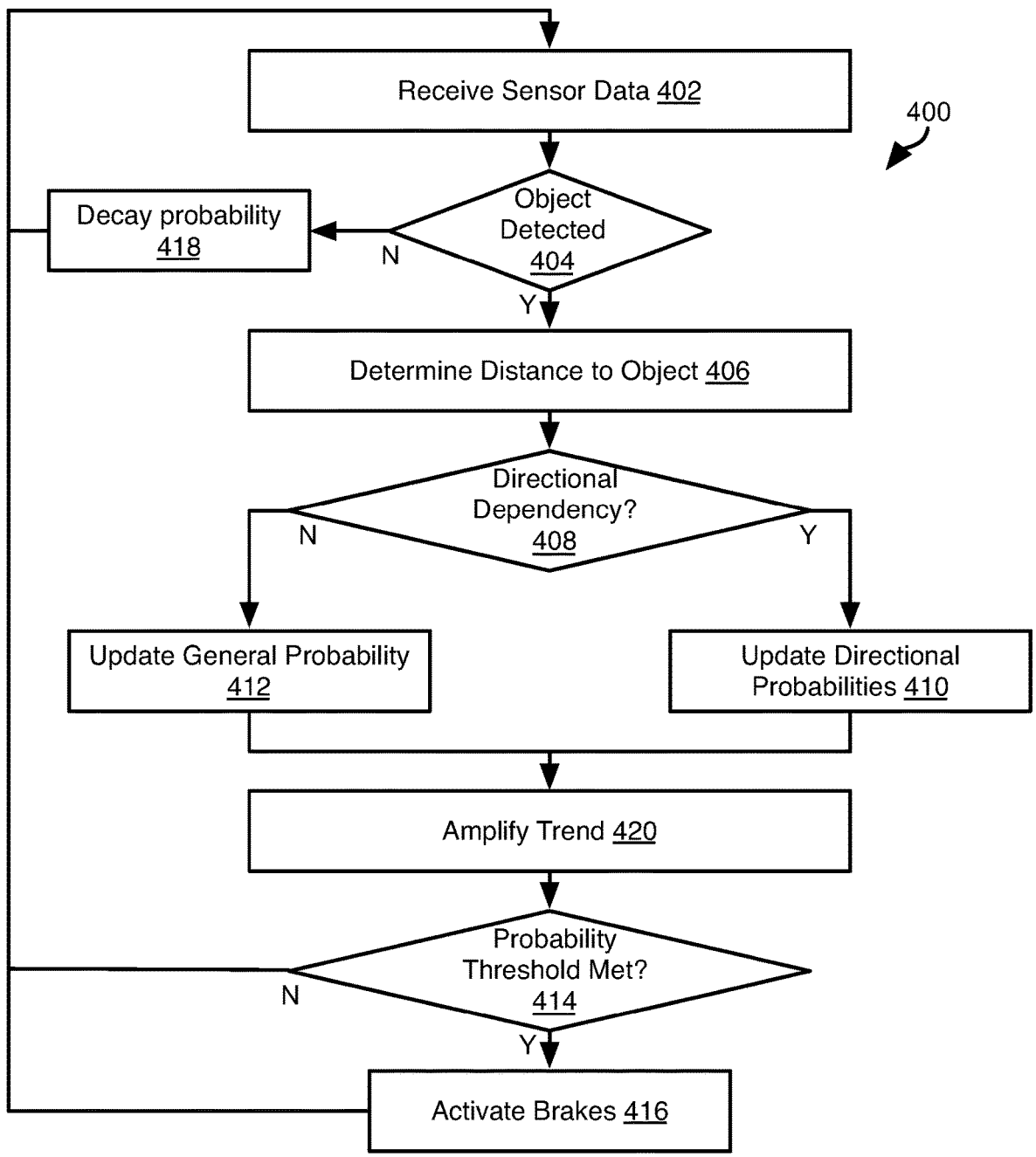
FIG. 4 is a process flow diagram of a method for detecting objects while reversing in accordance with an embodiment of the present invention.

Referring to FIG. 4 the illustrated method 400 may be executed by the controller 102 in response to receiving outputs of the imaging devices 104a, 104b and other sensors 106a, 106b. The method 400 is performed for outputs from all of the imaging devices 104a, 104b and other sensors 106a, 106b such that any feature in the output of any sensor may contribute to an increase in the probability that an object is present within the zone of interest 302. In particular, a single probability metric may be updated based on detecting different objects by different sensors.

The method 400 may include receiving 402 sensor data. The method 400 may be executed with respect to each frame of sensor data received from the imaging devices 104*a*, 104*b* and the other sensors 106*a*, 106*b* (hereinafter "sensing devices 104*a*, 104*b*, 106*a*, 106*b*"). Alternatively, the method 400 may process frames of sensor data from multiple sensing devices 104*a*, 104*b*, 106*a*, 106*b* simultaneously.

The method 400 may include evaluating 404 whether an object is detected in the sensor output, which may be a pair of binocular images, a point cloud, detected radar or ultrasound reflections, or any other sensor output. The manner in which objects are detected in these outputs may include using any method known in the art for detecting objects using binocular vision, RADAR sensor, LIDAR sensor, ultrasonic sensor, or other type of sensor for detecting the environment of a vehicle. Detecting 404 an object may or may not be accurate, inasmuch as sensors may have false positives. Accordingly, detecting 404 an object may include detecting a feature in the output of a sensing device 104*a*, 104*b*, 106*a*, 106*b* that indicates a potential obstruction. Accordingly, references to detected objects herein below refer to processing of obstruction-indicating features in sensor outputs.

If an object is detected 404, then the remaining elements of the method 400 may be executed. This may include determining 406 a distance to the detected object. This may include any method known in the art for detecting the location of objects using binocular vision, RADAR sensor, LIDAR sensor, ultrasonic sensor, or other type of sensor for detecting the environment of a vehicle. In some embodiments, detecting 404 an object may inherently include determining its location such that step 406 does not include a different step.

The sensing devices 104*a*, 104*b*, 106*a*, 106*b* may provide a location of an object in different coordinate systems or different forms, such as in the form of a time to impact. Accordingly, step 406 may include translating the locations into a common coordinate systems or a common distance metric, e.g. a longitudinal distance behind the vehicle 300 or a lateral distance from a longitudinal center line of the vehicle 300.

Each of the sensing devices 104*a*, 104*b*, 106*a*, 106*b* may have a variance indicating an uncertainty in one or both of the distance to an object determined from an output of the sensor and whether an object is in fact present when a feature in the sensor output indicates that an object is present.

In some instances, this variance may be directional, i.e. a sensor may more accurately sense a longitudinal location of an object than the lateral location of an object, or vice versa. Accordingly, a sensor may have a longitudinal variance and a lateral variance. If a sensor from which the output of step 402 was received is found 408 to have a directionally dependent variance, the method 400 may include updating 410 directional probabilities.

Specifically, for each output found 404 to indicate presence of an object, a probability may be updated such that the probability increases each time the sensing devices 104*a*, 104*b*, 106*a*, 106*b* senses an object. In some embodiments, the probability is updated according to a function that increases with both the number of times an output indicates an object is present and a distance to a sensed object indicated by that output. In some embodiments, the probability may be updated according to a function of all of the following parameters: (a) the number of times sensor outputs indicate objects, (b) the distance to the sensed objects, and (c) a variance of the sensor that indicates the presence of the sensed objects. Specifically, the amount by which the probability increases in response to detecting 404 an object will be greater with smaller distance to the object and with smaller variance in the sensor that detected the object.

Where the probability is zero, i.e. no object has been previously detected, the probability may be calculated based on these parameters using a Bayesian probability function. Where the probability is non-zero, the probability may be updated in response to each detection 404 of an object according to these parameters using a Bayesian probability update technique.

In the case of directionally dependent variance, directional probabilities, e.g., a longitudinal probability and a lateral probability, may be updated 410 or initially calculated, where the longitudinal probability is calculated according to the distance and longitudinal variance of the sensing device 104*a*, 104*b*, 106*a*, 106*b* and the lateral probability is calculated according to the distance and lateral variance of the sensing device 104*a*, 104*b*, 106*a*, 106*b*.

Where a sensing device 104*a*, 104*b*, 106*a*, 106*b* from which the sensor data of step 402 was received does not have a directional dependency, a single general probability may be updated 412 using the same parameters and in the same manner as for the directional probabilities. Alternatively, step 412 may include updating 412 the directional probabilities using the directionally-independent variance of the sensing device 104*a*, 104*b*, 106*a*, 106*b* to update both directional probabilities.

The method 400 may include evaluating 414 whether a probability threshold has been met. This may include evaluating one or more of the general probability or of the directional probabilities exceeds some confidence threshold, e.g. at least 70%, 80%, 90%, or some other minimum percentage of certainty.

If so, then actions may be taken 416 by the controller such as automatically activating brakes, reducing or stopping acceleration, generating a perceptible alert to a driver, autonomously navigating the vehicle 300 around detected 404 objects, or any other action to prevent or reduce harm caused by impact.

In practice, the method 400 will result in an increase in probability for sensed objects that are far away from the vehicle. The probability will increase rapidly as an object approaches both because (a) distance is a factor in computing the probability and it is becoming smaller, (b) more sensors will detect the object, and (c) the object will have been detected an ever increasing number of times as it moves closer to the vehicle and the probability increases each time an object is detected. The probability may be calculated in such a way that presence of the object in the zone of interest 302 will have a sufficient large effect on the probability that the threshold of step 416 will be met.

In some embodiments, the probability (general and directional) may be decayed 418 in the absence of detection 404 of an object in the output of a sensor. For example, if no objects are detected in the outputs of any sensors for one or more data frames, the probability may be decayed 418, such as according to a decaying exponential function or according to a Bayesian probability update wherein the additional information is an absence of data confirming the probability indicated by the statistical model. The amount of decay may increase with an amount of time that passes between a data frame of any sensor that indicates an object and a current time at which the method 400 is executed.

In many instances objects may be transitorily present in or near the zone of interest 302. Likewise, sensor noise may result in transient perception of objects in the output of a sensing device 104a, 104b. Accordingly, not all perceived objects would require that braking or other actions to be taken. Decaying 418 the probability may reduce the impact of these transitory detections.

In some embodiments, the impact of transitory detections may be further reduced, and the impact of increasing probability may be amplified by amplifying 420 trends in the probability (general or directional). For example, if the probability is decaying over time, tuning parameters may be specified and the probability may be caused to decay more according to a function of the rate of decay in the probability and the tuning parameters.

Likewise, amplifying 420 trends may include increasing the probability as a function of the tuning parameters and a rate of increase of the probability over time, i.e. in response to detection 404 of objects for two or more iterations of the method 400. In this manner, the impact of objects that are non-transitory and are causing increase in the probability (general or directional) will be increased, ensuring that the probability will quickly reach the threshold that will invoke action, such as activating 416 the brakes.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising performing, by a vehicle controller:
   performing a plurality of iterations by:
   receiving a plurality of sensor outputs each including an obstruction-indicating feature from a plurality of sensors having a plurality of different sensing modalities;
   for a first iteration of the plurality of iterations, calculating a probability according to each sensor output of the plurality of sensor outputs and an estimated distance to the obstruction-indicating feature in the each sensor output, the probability indicating a probability of obstruction;
   for subsequent iterations of the plurality of iterations, updating the probability according to each sensor output of the plurality of sensor outputs and the estimated distance to the obstruction-indicating feature in the each sensor output, such that an amount by which the probability is increased increases with decrease in the estimated distance; and
   when the probability is sufficiently high to perform collision avoidance, performing collision avoidance;
   wherein at least one sensor of the plurality of sensors has a first variance corresponding to a first accuracy of first location measurements along a first direction of a plurality of directions and a second variance corresponding to a second accuracy of measurements along a second direction of the plurality of directions, the first accuracy being different from the second accuracy;
   wherein updating the probability comprises updating a first directional probability for each sensor output of the at least one sensor according to both of the estimated distance and the first variance and updating a second directional probability for each sensor output of the at least one sensor according to both of the estimated distance and the second variance.

2. The method of claim 1, wherein the plurality of sensors include at least two of a two-dimensional camera image, a radio distancing and ranging (RADAR) sensor, a light distancing and ranging (LIDAR) sensor, and an ultrasonic sensor.

3. The method of claim 1, wherein updating the probability comprises performing a Bayesian probability update.

4. The method of claim 1, wherein the plurality of sensors are rearward facing on a vehicle including the vehicle controller.

5. The method of claim 1, further comprising: reducing the probability in response to detecting a period of time in which no obstruction-indicating features are detected in outputs of the plurality of sensors.

6. The method of claim 5, further comprising:
   detecting a decreasing trend in the probability; and
   additionally reducing the probability in response to the decreasing trend.

7. The method of claim 6, further comprising:
   detecting an increasing trend in the probability; and
   additionally increasing the probability in response to the increasing trend.

8. The method of claim 1, further comprising, in response to determining that the probability is sufficiently high to perform collision avoidance, actuating at least one of a steering actuator, an accelerator actuator, and a brake actuator.

9. A system comprising:
   a plurality of sensors having a plurality of sensing modalities and having a zone of interest in fields of view thereof;
   a vehicle controller operably coupled to the plurality of sensors, the vehicle controller programmed to—
      perform a plurality of iterations each including:
         receiving a plurality of sensor outputs each including an obstruction-indicating feature indicating obstruction, the plurality of sensors having a plurality of different sensing modalities;
         for a first iteration of the plurality of iterations, calculating a probability according to each sensor output of the plurality of sensor outputs and an estimated distance to the obstruction-indicating feature in the each sensor output, the probability indicating a probability of obstruction within the zone of interest;
         for iterations subsequent to the first iteration, update the probability according to each sensor output of the plurality of sensor outputs and the estimated distance to the obstruction-indicating feature in the each sensor output; and
         if the probability meets a threshold condition, perform collision avoidance by ceasing movement into the zone of interest;
   wherein at least one sensor of the plurality of sensors has a first variance corresponding to a first accuracy of first location measurements along a first direction of a plurality of directions and a second variance corresponding to a second accuracy of measurements along a second direction of the plurality of directions, the first accuracy being different from the second accuracy;

wherein the vehicle controller programmed to update the probability by updating a first directional probability for each sensor output of the at least one sensor according to both of the estimated distance to the obstruction-indicating feature and the first variance and updating a second directional probability for each sensor output of the at least one sensor according to both of the estimated distance to the obstruction-indicating feature and the second variance.

10. The system of claim 9, wherein the plurality of sensors include at least two of a two-dimensional camera image, a radio distancing and ranging (RADAR) sensor, a light distancing and ranging (LIDAR) sensor, and an ultrasonic sensor.

11. The system of claim 9, wherein each sensor of the plurality of the sensors has a variance associated therewith;

wherein the vehicle controller is further programmed to update the probability according to each sensor output of the plurality of sensor outputs according to both of the estimated distance and the variance of a sensor of the plurality of sensors that generated the each sensor output.

12. The system of claim 9, wherein the vehicle controller is further programmed to update the probability by performing a Bayesian probability update.

13. The system of claim 9, wherein the plurality of sensors are rearward facing on a vehicle including the vehicle controller.

14. The system of claim 9, further comprising:

reducing the probability in response to detecting a period of time in which no obstruction-indicating features are detected in outputs of the plurality of sensors.

15. The system of claim 14, wherein the vehicle controller is further programmed to:

if a decreasing trend in the probability is detected, further reduce the probability in response to the decreasing trend.

16. The system of claim 15, wherein the vehicle controller is further programmed to:

if an increasing trend in the probability is detected, additionally increase the probability in response to the increasing trend.

17. The system of claim 9, further comprising at least one of a steering actuator, an accelerator actuator, and a brake actuator;

wherein the vehicle controller is further programmed to, if the probability meets the threshold condition, activate at least one of the steering actuator, the accelerator actuator, and the brake actuator.

* * * * *